No. 782,767.　　　　　　　　　　　　　　　　　PATENTED FEB. 14, 1905.
J. G. STEWART.
WHEEL.
APPLICATION FILED MAR. 29, 1904.

2 SHEETS—SHEET 1.

Witnesses
F. W. Riley.
Herbert D. Lawson.

Inventor
James Gordon Stewart.

By Victor J. Evans
Attorney

No. 782,767.

Patented February 14, 1905.

UNITED STATES PATENT OFFICE.

JAMES GORDON STEWART, OF PIETERMARITZBURG, NATAL.

WHEEL.

SPECIFICATION forming part of Letters Patent No. 782,767, dated February 14, 1905.

Application filed March 29, 1904. Serial No. 200,599.

*To all whom it may concern:*

Be it known that I, JAMES GORDON STEWART, a subject of the King of England, residing at Pietermaritzburg, Natal, have invented new and useful Improvements in Wheels, of which the following is a specification.

My invention relates to new and useful improvements in wheels for bicycles, carriages, automobiles, and other vehicles; and its object is to provide a device of this character having a pneumatic hub of simple, durable, and inexpensive construction, which serves as a substitute for the pneumatic tire ordinarily employed. Pneumatic tires are expensive, because of the large quantity of rubber used in their formation, and are also objectionable for the reason that they are easily injured and worn.

The object of my invention is to provide a pneumatic tube which is located within the hub of a wheel and is inclosed, and therefore protected from all injury.

A further object is to provide means whereby the hub is prevented from slipping upon the tube without the necessity of fastening said tube to the hub.

With the above and other objects in view the invention consists in mounting a sleeve upon the spindle or axle of the wheel, and this sleeve has a concaved groove extending therearound, in which is seated a circular pneumatic tube formed of rubber or other flexible material. A ring incloses the tube and has a groove in its inner face for the reception thereof, and this ring is held in proper relation to the sleeve by means of face-plates which are secured to the sleeve and overlap the sides of the ring. The wheel-spokes are adapted to be secured to the ring in any suitable manner, and the rim of the wheel is provided with any suitable form of tire.

The invention also consists in the further novel construction and combination of parts hereinafter more fully described and claimed, and illustrated in the accompanying drawings, showing the preferred form of my invention, and in which—

Figure 1:
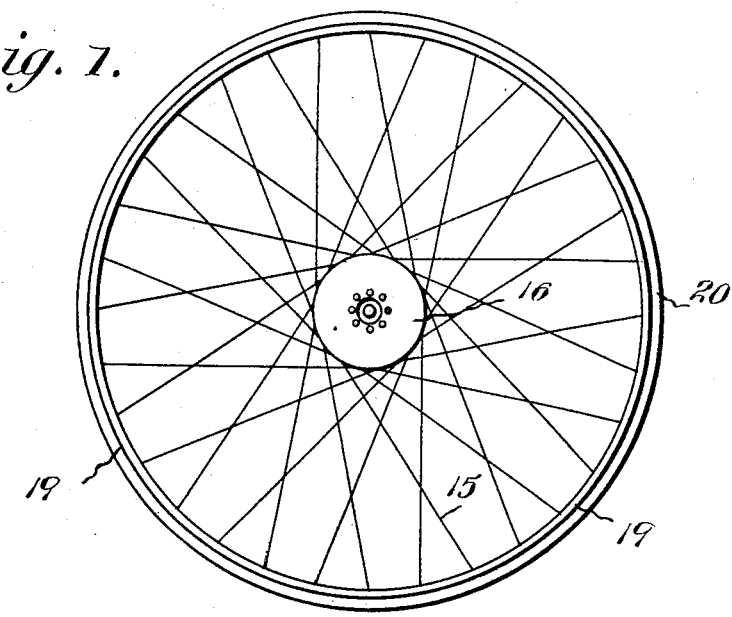
Figure 2:
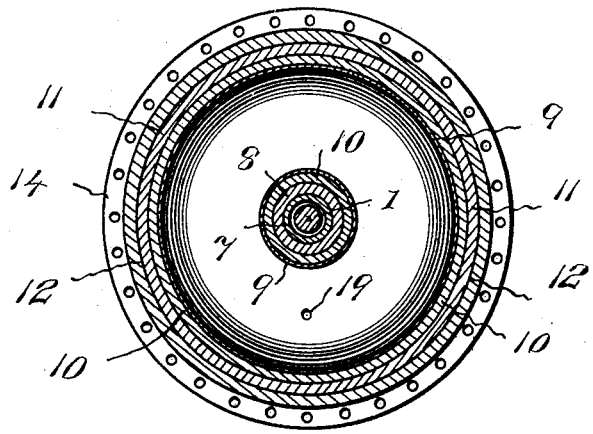
Figure 3:
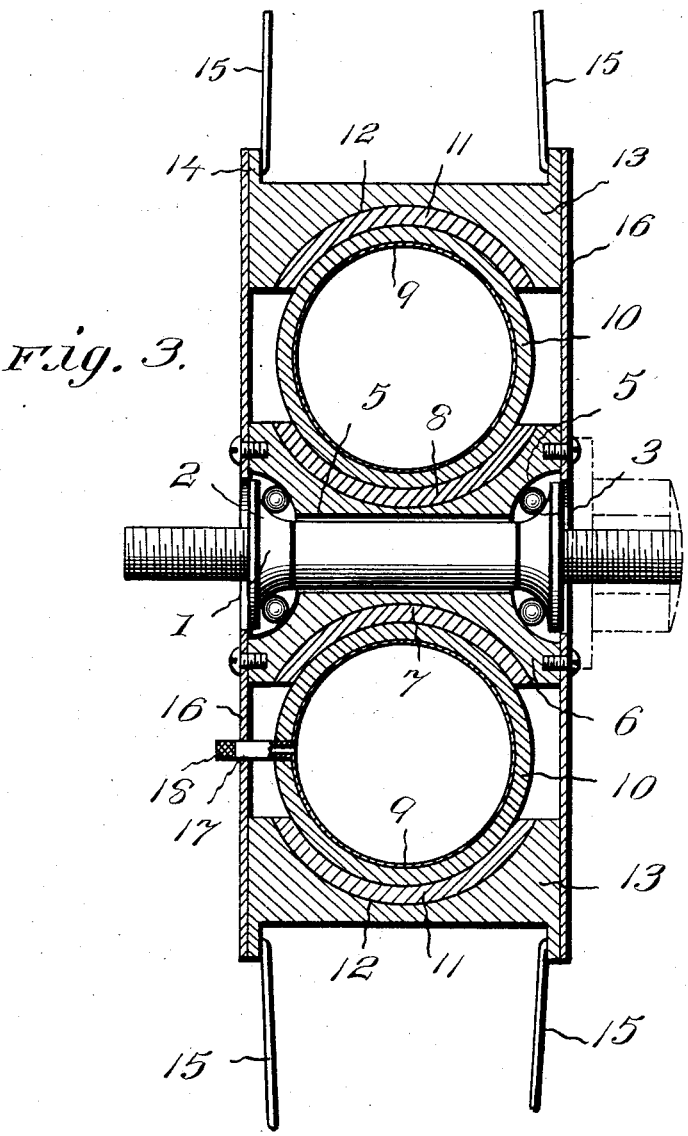

Figure 1 is a side elevation of a wheel constructed in accordance with my invention. Fig. 2 is a central vertical section through the hub, and Fig. 3 is an enlarged transverse section through the hub.

Referring to the figures by numerals of reference, 1 is a spindle of a bicycle-wheel, having cones 2 thereon, which form bearings for balls 3. These balls are seated in the enlarged ends of a passage 5, formed within a sleeve 6 and in which the spindle is loosely mounted. The sleeve has a groove 7 extending therearound, and this groove is concaved in cross-section and has a covering 8, of felt or other light material. A flexible pneumatic tube 9, formed of rubber or other desired material, is arranged within the groove 7 and has a covering 10, of felt, which is adapted to bear upon the felt cushion 8 and also upon a similar cushion 11, arranged within a groove 12, formed within the inner face of a ring 13. This ring incloses and is concentric with the tube 9 and has flanges 14 at the sides thereof, adapted to be engaged by spokes 15. Face-plates 16 are secured to the side of the sleeve 6 and overlap the sides of ring 13 and serve to guide it. A valved air-inlet tube 17 extends through one of the face-plates 16 and opens into the tube 9, and this tube 17 has a cap 18 for sealing the same. The rim 19 of the wheel is secured to the spokes in any suitable manner and is provided with a tire 20, which can be formed of metal, leather, or any other desired material.

In assembling the parts herein described the sleeve 6 is placed on spindle 1 after one of the cones 2 has been removed, and after said cone has been replaced the covered tube 9 is placed about the sleeve and within the groove 7. The ring 13 is then placed about the tube 9 and the face-plates 16 are secured in position. Tube 9 is subsequently inflated by forcing air thereinto through the tube 17, and this inflation of tube 9 will cause it to expand, so as to fit snugly upon the cushions 8 and 11. The face-plates 10 guide the ring when the same is moved therebetween and holds said ring and the sleeve at all times in alinement with each other. The cushions 8 and 11 and the covering 10 serve to protect the tire 9 from wear and also prevent same from slipping upon the sleeve or the ring. It will be seen that the device is very simple and inexpensive in construction and that the parts can be readily assembled or taken apart.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In a wheel, the combination with a sleeve having a groove extending therearound; of a cushion within the groove, a tube inclosing the sleeve and seated upon the cushion, a ring inclosing the tube having a groove therein, a cushion within the groove and bearing upon the tube, and face-plates secured to the sleeve and overlapping the sides of the ring.

2. In a wheel, the combination with a sleeve having a groove extending therearound, and a cushion within the groove; of a pneumatic tube inclosing the sleeve, a covering therefor seated upon the cushion, a ring inclosing the tube and having a groove therein, a cushion within the groove adapted to bear upon the tire-covering, face-plates secured to the sleeve and overlapping the sides of the ring, a rim, and a spoke connecting the rim with the ring.

3. In a wheel, the combination with a sleeve having a groove extending therearound, and a cushion within the groove; of a pneumatic tube inclosing the sleeve and having a resilient covering, a ring inclosing the tube and having a groove in its inner face, a cushion within the groove adapted to bear upon the tube, face-plates secured to the sleeve and overlaping the sides of the ring, a spindle revolubly mounted within the sleeve, cones therein adapted to extend into the face-plates, and bearings interposed between the cones and sleeve.

In testimony whereof I affix my signature in presence of two witnesses.

JAMES GORDON STEWART.

Witnesses:
R. L. WHITTAKER,
ARCHIBALD J. ADRE.